United States Patent
Treuner et al.

[11] 3,897,423
[45] July 29, 1975

[54] AMINO SUBSTITUTED ACYLTHIO CEPHALOSPORINS

[75] Inventors: Uwe D. Treuner; Hermann Breuer, both of Regensburg, Germany

[73] Assignee: E. R. Squibb & Sons, Inc., Princeton, N.J.

[22] Filed: Mar. 5, 1973

[21] Appl. No.: 337,806

[52] U.S. Cl............................ 260/243 C; 424/246
[51] Int. Cl................................................. C07d 99/24
[58] Field of Search ................................ 260/243 C

[56] References Cited
UNITED STATES PATENTS
3,741,962  6/1973  Brever............................ 260/243 C

*Primary Examiner*—Nicholas S. Rizzo
*Attorney, Agent, or Firm*—Lawrence S. Levinson; Merle J. Smith

[57] ABSTRACT

Amino substituted acylthio cephalosporins of the general formula

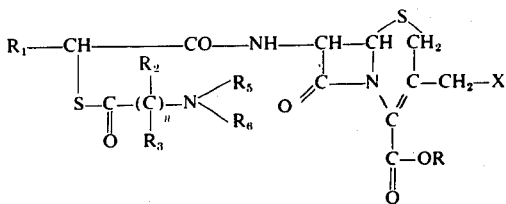

wherein R is hydrogen, lower alkyl, aralkyl, tri(lower alkyl)silyl, tri(lower alkyl)stannyl, a salt forming ion or the group

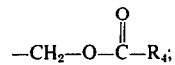

$R_1$ is hydrogen, lower alkyl, aryl or certain heterocyclic groups; $R_2$ and $R_3$ each is hydrogen, lower alkyl or phenyl $R_4$ is lower alkyl, aryl or aralkyl; $R_5$ is hydrogen or lower alkyl; $R_6$ is hydrogen or lower alkyl; or together $R_5$ and $R_6$ complete certain nitrogen heterocyclics; X is hydrogen, hydroxy, azido, lower alkanoyloxy, lower alkoxy, lower alkylthio, lower alkylthiadiazolythio, the radical of a nitrogen base, or together X and R represent a bond linking carbon and oxygen in a lactone ring; and n is 1, 2 or 3; are useful as antibacterial agents.

9 Claims, No Drawings

AMINO SUBSTITUTED ACYLTHIO CEPHALOSPORINS

SUMMARY OF THE INVENTION

This invention relates to new aminoacylthiocephalosporins of the formula (I)

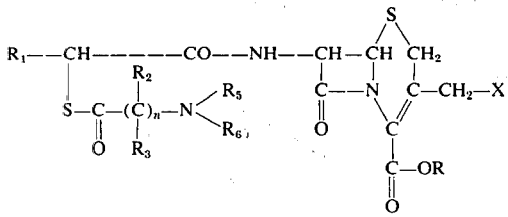

R represents hydrogen, lower alkyl, aralkyl, tri(lower alkyl)silyl, tri(lower alkyl)stannyl, a salt forming ion or the group

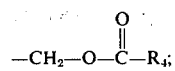

$R_1$ represents hydrogen, lower alkyl, aryl or certain heterocyclic groups; $R_2$ and $R_3$ each is hydrogen, lower alkyl or phenyl; $R_4$ represents lower alkyl, aryl or aralkyl; $R_5$ is hydrogen or lower alkyl; $R_6$ is hydrogen or lower alkyl or $R_5$ and $R_6$ together complete certain nitrogen heterocyclics and $n$ is 1, 2 or 3. X is hydrogen, hydroxy, azido, lower alkanoyloxy, lower alkoxy, lower alkylthio, lower alkylthiadiazolylthio, the radical of a nitrogen base, or together X and R represent a bond linking carbon and oxygen in a lactone ring.

The preferred members within each group are as follows: R is hydrogen, alkali metal or

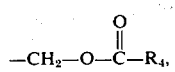

especially hydrogen, methyl, pivaloyloxy, sodium or potassium; $R_1$ is hydrogen, phenyl, thienyl, furyl or isothiazolyl, especially hydrogen or phenyl; $R_2$ and $R_3$ each is hydrogen or lower alkyl, especially each is hydrogen, and methyl or ethyl when one or both is lower alkyl; $R_4$ is lower alkyl, preferably methyl or t-butyl; $R_5$ and $R_6$ each is lower alkyl; $n$ is 1 or 2, especially 1; and X is preferably hydrogen or acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like. The lower alkoxy and lower alkylthio groups include similar radicals.

The aryl groups are phenyl and simply substituted phenyl having one to three substituent groups. This includes phenyl and simply substituted phenyl bearing one to three substituents $R_7$ (preferably only one), such as the halogens (chlorine and bromine being preferred), lower alkyl groups such as those defined above, lower alkoxy groups, hydroxy or carboxy. In the case of the last two named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p-hydroxyphenyl, p-carboxyphenyl and the like.

The aralkyl groups include phenyl and phenyl attached to a lower alkyl group, including substituted phenyl rings, all as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The lower alkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. X also represents the radical of an amine, e.g., a lower alkylamine like methylamine, ethylamine, dimethylamine, triethylamine, phenyl-lower alkylamine like dibenzylamine, and pyridine and quinoline quaternaries like pyridinium, 1-quinolinium, 1-picolinium, etc. X and R may also join together, as indicated above, to form a bond linking carbon and oxygen in a lactone ring.

The heterocyclic groups represented by $R_1$ are pyridyl, thienyl, furyl and isothiazolyl, as well as these heterocyclics with one or two of the substituents ($R_8$) halo, lower alkyl (particularly methyl and ethyl), lower alkoxy (particularly methoxy and ethoxy) or phenyl. $R_5$ and $R_6$ together with the nitrogen to which they are attached may also form a heterocyclic, i.e., piperidino, morpholino, thiamorpholino or piperazino and these too may bear one or two of the substituents ($R_8$) referred to above.

The salt forming ions represented by R are metal ions, e.g., aluminum, alkali metal ions such as sodium or potassium, alkaline earth metal ions such as calcium or magnesium, or an amine salt ion, of which a number are known for this purpose, for example, phenyl-lower alkylamines like dibenzylamine, N,N-dibenzylethylenediamine, lower alkylamines like methylamine, triethylamine, procaine, lower alkylpiperidines like N-ethylpiperidine, etc. The ester forming tri(lower alkyl)silyl and tri(lower alkyl)stannyl groups include, for example, trimethylsilyl, triethylsilyl, tri-n-butylstannyl and the like.

The new acylthiocephalosporins of the invention are produced by reacting a 7-aminocephalosporanic acid compound of formula II [which includes particularly 7-aminocephalosporanic acid (7-ACA) and 7-amino-3-desacetoxycephalosporanic acid (7-ADCA)], or an activated derivative thereof, of the formula (II)

$$H_2N-CH-CH\ CH_2$$

with an acid of the formula (III)
$$R_1-CH-COOH$$
$$\phantom{R_1-CH-}\underset{O}{\overset{R_2}{S-C-(C)_n-N}}\underset{R_3}{\overset{R_5}{\diagdown R_6}}$$

The activated derivatives refered to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between the 7-aminocephalosporanic acid compound and the acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent. Other known methods involving mixed anhydrides, activated esters or amides, isoxazolium salts, etc. may also be utilized.

When R is the acyloxymethyl group $$-CH_2-O-\overset{O}{\underset{\|}{C}}-R_4,$$

this group may be introduced into the 7-aminocephalosporanic acid moiety prior to the reaction with the acid or the activated derivative by treatment with one to two moles of a halomethyl ester of the formula (IV)    hal—CH$_2$OCOR$_4$ wherein hal is halogen, preferably chlorine or bromine, in an inert organic solvent such as dimethylformamide, acetone, dioxane, benzene or the like, at about ambient temperature or below.

As an alternative, a product of formula I may be produced by reacting a salt, e.g., an alkali metal salt of a compound of the formula (V)
$$Me-S-\underset{O}{\overset{R_2}{\underset{\|}{C}}}-(C)_n-N\underset{R_6}{\overset{R_5}{\diagdown}}$$
$$\phantom{Me-S-C-}R_3$$

with a compound of the formula $$R_1-CH-CO-NH-\text{[β-lactam]}-CH_2-X$$
$$\phantom{R_1-}|$$
$$\phantom{R_1-}hal$$

(VI)

or derivative thereof, in a solvent such as dimethylformamide. Me represents a metal, hal is halogen, preferably chlorine or bromine and all the other symbols are the same as above.

The acid of formula IV and the salt of formula V are produced as follows according to the generally known method:

An amino acid of the formula (VIII)
$$\underset{R_6}{\overset{R_5}{\diagdown}}N-(\overset{R_2}{\underset{R_3}{C}})_n-COOH$$

is treated with a halogenated compound of the formula (VIII)
$$H_3C-\underset{CH_3}{\overset{CH_3}{\underset{|}{\overset{|}{C}}}}-CO-Cl$$

thereby obtaining a compound of the formula (IX)
$$\underset{R_6}{\overset{R_5}{\diagdown}}N-(\overset{R_2}{\underset{R_3}{C}})_n-COOCOO\underset{CH_3}{\overset{CH_3}{\underset{|}{\overset{|}{C}}}}-CH_3$$

Treatment of this product with hydrogen sulfide in pyridine yields a compound of the formula (X)
$$\underset{R_6}{\overset{R_5}{\diagdown}}N-(\overset{R_2}{\underset{R_3}{C}})_n-\underset{O}{\overset{\|}{C}}-SH$$

The intermediate of formula X is then converted to the alkali metal salt, e.g., with potassium methoxide to obtain a product of the formula (XI)
$$\underset{R_6}{\overset{R_5}{\diagdown}}N-(\overset{R_2}{\underset{R_3}{C}})_n-\underset{O}{\overset{\|}{C}}-S-K$$

which corresponds to the product of formula V. When this salt is treated with a halo acid of the formula (XII)    $R_1-CH-COOH$
         $\phantom{R_1-C}|$
         $\phantom{R_1-C}hal$ in a solvent such as dimethylformamide the acid of formula III is obtained.

See Bonner, Jour. Org. Chem. 33, 1831 (1968). See also U.S. Pat. No. 3,264,337, Aug. 2, 1966.

Further process details are also provided in the illustrative examples.

Certain of the compounds of this invention may exist in different optically active forms. The various stereoisomeric forms as well as the diastereoisomeric mixtures are within the scope of the invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used an antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg/kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

DL-7-[2-[[(dimethylamino)acetyl]thio]-2-phenylacetamido]cephalosporanic acid 2.35 g. (5 mmol.) of 7-(2-bromo-2-phenylacetamido)cephalosporanic acid and 0.8 g. (5 mmol.) of (dimethylamino)thioacetic acid S-potassium salt in 20 ml. of dimethylformamide are stirred for 30 minutes at room temperature, then poured into ice water and extracted with 3 × 50 ml. of ethyl acetate. The organic phase is dried and the solvent driven off to give DL-7-[2-[[(dimethylamino)acetyl]thio]-2-phenylacetamido]cephalosporanic acid, m.p. 141°.

EXAMPLE 2

7-[2-[[(dimethylamino)acetyl]thio]acetamido]cephalosporanic acid

By substituting 2 g. (5 mmol.) of 7-(2-bromo-2-phenylacetamido)cephalosporanic acid in the procedure of Example 1, 7-[2-[[(dimethylamino)]acetyl]thio]acetamido]cephalosporanic acid, m.p. 128°, is obtained.

EXAMPLE 3

DL-7-[[(dimethylamino)acetyl]thio]-2-phenylacetamido]-3-desacetoxycephalosporanic acid By substituting 7-(2-bromo-2-phenylacetamido)-3-desacetoxycephalosporanic acid for the 7-(2-bromo-2-phenylacetamido)cephalosporanic acid in the procedure of Example 1, DL-7-[2-[[(dimethylamino)]acetyl]thio]-2-phenylacetamido]-3-desacetoxycephalosporanic acid is obtained.

The potassium salt is obtained by treating the free acid with an equivalent amount of potassium carbonate.

The following additional products having the formula (c) in the table are obtained by the procedure of Example 2 by substituting for the 7-α-(bromophenylacetamido)cephalosporanic acid, the starting material (a), and for the (dimethylamino)thioacetic acid salt, the starting material (b) with the substituents indicated in the table:

TABLE

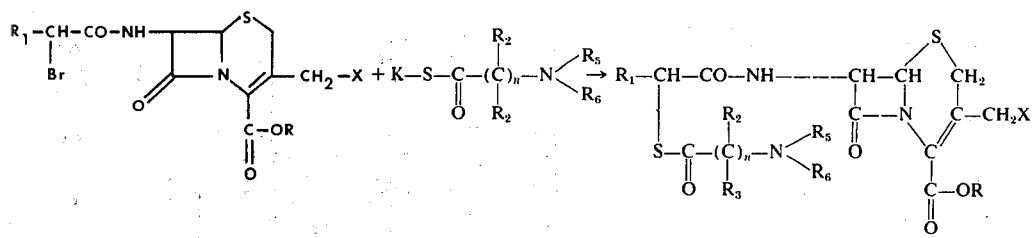

| Example | R | R₁ | R₂ | R₃ | R₅ | R₆ | n | X |
|---------|---|----|----|----|----|----|----|---|
| 4 | K | H | H | H | C₂H₅ | C₂H₅ | 1 | H |
| 5 | C₂H₅ | CH₃ | H | H | H | CH₃ | 1 | OH |
| 6 | H | C₆H₅ | H | H | CH₃ | CH₃ | 1 | pyridinium |
| 7 | —CH₂OC(O)—CH(CH₃)₂ | C₆H₅ | H | H | CH₃ | CH₃ | 1 | OCOCH₃ |
| 8 | —CH₂OC(O)—C₆H₅ | 4—ClC₆H₄ | H | H | C₂H₅ | C₂H₅ | 1 | OCOCH₃ |
| 9 | K | 3,4—(CH₃O)₂C₆H₃ | CH₃ | H | CH₃ | CH₃ | 1 | H |
| 10 | H | C₆H₅ | H | H | C₂H₅ | C₂H₅ | 2 | S—(N=N)—CH₃ (thiadiazole) |

TABLE—Continued

| Example | R | $R_1$ | $R_2$ | $R_3$ | $R_5$ | $R_6$ | n | X |
|---|---|---|---|---|---|---|---|---|
| 11 | H | $C_6H_5$ | | H | H | (piperidine NH) | 2 | $OCOCH_3$ |
| 12 | H | H | | H | H | (morpholine NH) | 2 | $OCOCH_3$ |
| 13 | H | $C_6H_5$ | | $CH_3$ | $CH_3$ | $CH_3$ | $CH_3$ | 1 | $SCH_3$ |
| 14 | H | $3,4,5-(CH_3O)_3C_6H_2$ | | H | H | H | $C_2H_5$ | 2 | $OCOCH_3$ |
| 15 | Na | $4-CH_3C_6H_4$ | | H | H | H | $CH_3$ | 1 | $OCOCH_3$ |
| 16 | lactone (+X) | $3,4-(Br)_2C_6H_3CH_2$ | | H | H | $CH_3$ | $CH_3$ | 1 | lactone(+R) |
| 17 | Na | H | | H | H | (N-methylpiperazine) | 1 | $OCOCH_3$ |
| 18 | K | (isothiazolyl) | | H | H | $C_2H_5$ | $C_2H_5$ | 1 | $OCH_3$ |
| 19 | H | (thienyl) | | H | H | $CH_3$ | $CH_3$ | 1 | $OCOCH_3$ |
| 20 | $C_6H_5CH_2$ | ($CH_3$-furyl) | | H | $CH_3$ | $C_2H_5$ | $C_2H_5$ | 1 | $OCOCH_2C_6H_5$ |
| 21 | $CH_2OC(O)-C(CH_3)_3$ | $C_6H_5$ | | H | H | $CH_3$ | $CH_3$ | 3 | $N_3$ |
| 22 | H | $C_6H_5$ | | $C_6H_5$ | H | $CH_3$ | $CH_3$ | 1 | $OCOCH_3$ |
| 23 | H | (furyl) | | H | H | H | $CH_3$ | 4 | H |
| 24 | $CH_2O-C(O)-C(CH_3)_3$ | $C_6H_5$ | | $CH_3$ | $CH_3$ | $CH_3$ | H | 1 | $OOC-C_6H_5$ |
| 25 | H | $C_6H_5$ | | H | $C_6H_5$ | $CH_3$ | $CH_3$ | 1 | $SC_2H_5$ |
| 26 | Na | $C_6H_5$ | | H | H | H | $C_2H_5$ | 2 | H |
| 27 | $CH_2O-C(O)-C(CH_3)_3$ | $C_6H_5$ | | H | $CH_3$ | $CH_3$ | $CH_3$ | 1 | $SCH_3$ |
| 28 | H | $C_6H_5$ | | H | $C_2H_5$ | $CH_3$ | $CH_3$ | 1 | H |
| 29 | H | $C_6H_5$ | | H | H | $C_2H_5$ | $C_2H_5$ | 1 | H |
| 30 | H | $C_6H_5$ | | $C_6H_5$ | $C_6H_5$ | $C_2H_5$ | $C_2H_5$ | 1 | $OCOCH_3$ |
| 31 | H | $C_6H_5$ | | H | H | $CH_3$ | $CH_3$ | 1 | $OC_2H_5$ |
| 32 | $Si(CH_3)_3$ | $C_6H_5$ | | H | H | $CH_3$ | $CH_3$ | 1 | H |
| 33 | $Sn(n-butyl)_3$ | (pyridyl) | | H | H | $C_2H_5$ | $C_2H_5$ | 1 | H |
| 34 | H | $C_6H_5$ | | H | H | H | $CH_3$ | 1 | $N_3$ |

What is claimed is:

1. A compound of the formula

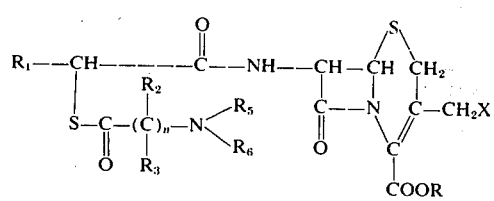

wherein R is hydrogen, lower alkyl, phenyl-lower alkyl, tri(lower alkyl)silyl, tri(lower alkyl)stannyl,

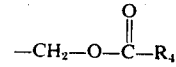

or a salt forming ion selected from the group consisting of alkali metal, alkaline earth metal, lower alkylamine, phenyl-lower alkylamine or lower alkylpiperidine; $R_1$ is phenyl or $R_7$-phenyl; $R_2$ and $R_3$ each is hydrogen, lower alkyl or phenyl; $R_4$ is lower alkyl, phenyl or phenyl-lower alkyl; $R_5$ and $R_6$ each is hydrogen or lower alkyl; $R_7$ is halo, hydroxy, lower alkyl, lower alkoxy or carboxy; X is hydrogen, hydroxy or lower alkanoyloxy; and $n$ is 1, 2 or 3.

2. A compound as in claim 1 wherein R is hydrogen, alkali metal, or

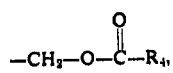

$R_1$ is phenyl, $R_2$ and $R_3$ each is hydrogen or lower alkyl, $R_4$, $R_5$ and $R_6$ each is lower alkyl, $n$ is 1 or 2 and X is hydrogen or acetoxy.

3. A compound as in claim 1 wherein $R_1$ is phenyl.

4. A compound as in claim 3 wherein R, $R_2$, $R_3$ and X each is hydrogen, $R_5$ and $R_6$ each is lower alkyl.

5. A compound as in claim 4 wherein each lower alkyl group is methyl and $n$ is 1.

6. A compound as in claim 3 wherein R, $R_2$ and $R_3$ each is hydrogen, $R_5$ and $R_6$ each is lower alkyl and X is acetoxy.

7. A compound as in claim 6 wherein each lower alkyl group is methyl and $n$ is 1.

8. A compound as in claim 1 wherein R, $R_1$, $R_2$ and $R_3$ each is hydrogen, $R_5$ and $R_6$ each is lower alkyl and X is acetoxy.

9. A compound as in claim 8 wherein each lower alkyl group is methyl and $n$ is 1.

* * * * *